H. A. COOPER.
PIPE REMOVER.
APPLICATION FILED DEC. 22, 1916.
1,227,391. Patented May 22, 1917.
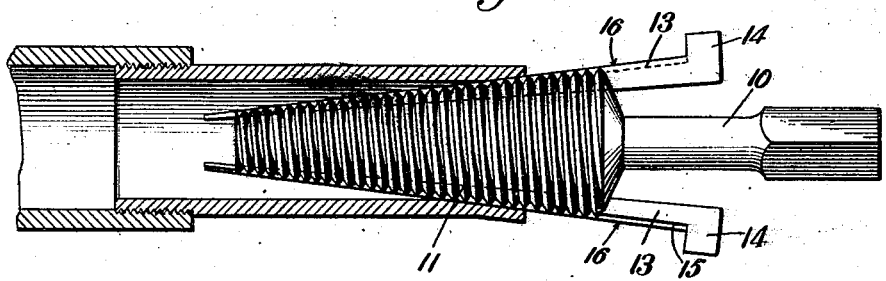
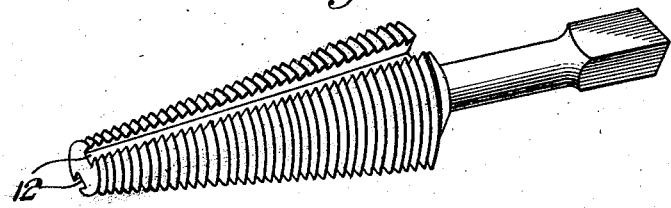
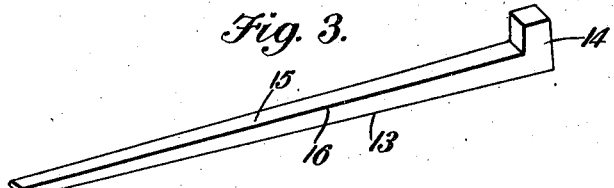
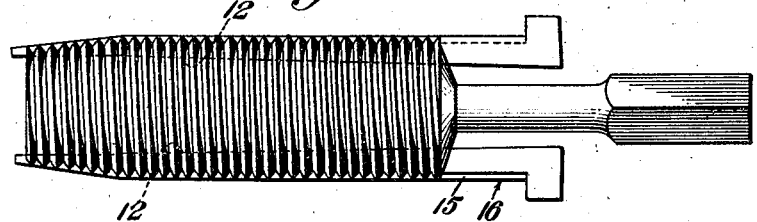
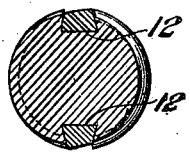
WITNESSES —
INVENTOR
Henry A. Cooper,
BY
ATTORNEY

UNITED STATES PATENT OFFICE.

HENRY A. COOPER, OF PEEBLES, OHIO.

PIPE-REMOVER.

1,227,391.  Specification of Letters Patent.  Patented May 22, 1917.

Application filed December 22, 1916. Serial No. 138,479.

*To all whom it may concern:*

Be it known that I, HENRY A. COOPER, a citizen of the United States, residing at Peebles, in the county of Adams and State of Ohio, have invented new and useful Improvements in Pipe-Removers, of which the following is a specification.

This invention comprehends the provision of a device designed to facilitate the removal of broken pipes from sleeves, elbows, unions or the like, the device being simple in its construction and convenient to manipulate for the purpose intended.

The nature and advantages of the invention will be better understood from the following description when read in connection with the accompanying drawing, the invention residing in the construction, combination and arrangement of parts as claimed.

In the drawing forming part of this specification like numerals of reference indicate similar parts in the several views and wherein:—

Figure 1 is a view partly in section showing the manner of using the device.

Fig. 2 is a perspective view of the device constructed in accordance with my invention with the wedges removed.

Fig. 3 is a detail view of one of the wedges.

Fig. 4 is a view of a modified form of the invention.

A device constructed in accordance with my invention embodies a shank 10 which is provided with a threaded portion 11, the threaded portion as well as the shank 10 being of any suitable dimensions, as this forms no part of the invention. The devices vary in size to accommodate themselves to pipes of different diameters. The threaded portion 11 of the shank is preferably tapered toward one end of the shank so as to permit this form of the tool being used with pipes of different diameters, the modified form of the invention disclosed in Fig. 4 differing from the preferred form in that the threaded portion is substantially of equal diameter throughout its length. In both instances however the threaded portion of the shank is provided with diametrically opposed grooves 12, preferably of dove-tail formation, the grooves extending throughout the entire length of the threaded portion as shown.

Slidably fitted within each groove is a wedge-shaped element 13 of a length considerably greater than the length of the groove. and terminating at its broadest end to provide an offset portion 14. The elements when initially associated with the shank are arranged so that the outer face of the respective wedge elements of each shank, lie substantially flush with the circumference of the threaded portion, to permit the shank to be readily threaded into the pipe section that is desired to be removed. It might here be stated that one end of the shank is of angular formation in cross section to accommodate a tool or suitable instrument to rotate the shank while the latter is being threaded in the pipe. While the wedge-shaped elements lie substantially flush with the circumference of the threaded portion, the outer face of each element is beveled or inclined transversely throughout the entire length of the element, so that the latter is thicker along one of its longitudinal edges than along its opposite longitudinal edge, for the purpose to be presently described.

In practice when it is desired to remove a piece of pipe from a sleeve, union or the like, when the pipe has been broken off within said parts, the wedge-shaped elements are initially so placed that the free ends of the wedge-shaped elements terminate flush with the forward extremity of the shank. The shank is then threaded into the pipe section desired to be removed, and subsequent to this association of parts the wedge-shaped elements are driven forwardly in their grooves to cause the edge 16 of each element to bite into the threads of the pipe section desired to be removed, the edge 16 being reasonably sharp for this purpose and provided by the beveling of each of the wedge-shaped elements transversely as above described. The elements are driven forwardly in any suitable manner, a hammer or other tool being susceptible for use, while the offset extremity of each wedge element provides a means whereby the element can be easily driven into position. As shown two wedge elements are preferably employed with each shank, and the front and rear faces are oppositely beveled so that the shoulders 16 will be reversely disposed. It is manifest that subsequent to the positioning of the shank within the pipe section, and the driving of the wedge elements forwardly in the manner stated to cause the edge 16 of each element to bite into the pipe section, a proper purchase is had upon the latter, through the instrumentality of the wedge elements, and upon rotation of the shank in an opposite direction with a view of removing the same, the broken pipe section will be removed with the shank from the sleeve, elbow or the like in which it has broken off.

While it is believed that from the foregoing the nature and advantages of the invention will be readily apparent I desire to have it understood that what is herein shown and described is merely illustrative of the invention, and it is not to be in any way considered restrictive, as such changes in the construction and arrangement of parts may be resorted to when desired as fall within the scope of what is claimed.

What is claimed is:—

1. Means for removing a broken pipe section from a connection, including a shank having a threaded portion adapted to be screwed into the pipe section, said threaded portion being provided with a longitudinally extending groove, and a wedge-shaped element slidably fitted in the groove and adapted to be driven forwardly into engagement with the pipe section subsequent to the screwing of the shank into said section, whereby said pipe section is removed from its connection when the shank is rotated in the direction opposite its initial rotation.

2. Means for removing a broken pipe section from an associated element, including a shank having a threaded portion adapted to be screwed into the pipe section, said threaded portion having a longitudinally disposed groove, a wedge-shaped element slidably fitted in said groove, the outer face of said element being inclined transversely throughout its length whereby one edge of said element will cut into the pipe section when the element is driven forwardly in the groove, to obtain an effective purchase upon the pipe section, whereby said pipe section will be removed from its associated element upon rotation of the shank in a direction opposite the initial rotation of the shank.

In testimony whereof I affix my signature.

HENRY A. COOPER.